US009067531B2

(12) United States Patent
Del Pozo Gonzalez et al.

(10) Patent No.: US 9,067,531 B2
(45) Date of Patent: Jun. 30, 2015

(54) AMBIENT LIGHTING JIG ASSEMBLY AND METHOD

(71) Applicant: GM GLOBAL TECHNOLOGY OPERATIONS LLC, Detroit, MI (US)

(72) Inventors: Luis Miguel Del Pozo Gonzalez, Puebla (MX); Aurelien Doisy, Royal Oak, MI (US); David B. Wong, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 107 days.

(21) Appl. No.: 13/777,223

(22) Filed: Feb. 26, 2013

(65) Prior Publication Data

US 2014/0240988 A1    Aug. 28, 2014

(51) Int. Cl.
*B60Q 3/02*    (2006.01)

(52) U.S. Cl.
CPC .................. *B60Q 3/0296* (2013.01)
USPC ........... 362/282; 362/488; 362/489; 29/407.1

(58) Field of Classification Search
CPC .................................................. B60Q 3/0296
USPC ....................................... 362/282, 488, 489
See application file for complete search history.

(56) References Cited

U.S. PATENT DOCUMENTS

| 7,290,905 | B2 * | 11/2007 | Tiesler | 362/488 |
| 8,075,173 | B2 * | 12/2011 | Shallcross et al. | 362/581 |
| 2007/0268457 | A1 | 11/2007 | Chen et al. | |

FOREIGN PATENT DOCUMENTS

DE    102006021612 A    11/2007

\* cited by examiner

*Primary Examiner* — Stephen F Husar
*Assistant Examiner* — James Cranson, Jr.
(74) *Attorney, Agent, or Firm* — Quinn Law Group, PLLC

(57) ABSTRACT

An ambient lighting jig assembly generally includes a support assembly, a trim panel, an insert panel, and a light source. The support assembly defines an inner support cavity. The trim panel is configured to be coupled to the support assembly and at least partly defines a jig opening. The insert panel is configured to be rotatably coupled to the support assembly within the jig opening and has a reflective surface. The light source is configured to emit a light stream. Further, the light source is configured to be rotatably coupled to the support assembly within the inner support cavity at a plurality of angular positions so that the light stream is projected onto the reflective surface for use in determining an optimal angle for the insert panel and the light source.

20 Claims, 3 Drawing Sheets

AMBIENT LIGHTING JIG ASSEMBLY AND METHOD

TECHNICAL FIELD

The present disclosure relates to apparatus and methods for making an illuminated trim panel.

BACKGROUND

Motor vehicles typically include trim panels, such as instrument panel trim members and door panels, covering interior components. To provide ambient lighting within the vehicle passenger compartment, a light may be shined onto the trim panels and reflected toward a vehicle occupant in a seated position.

SUMMARY

The present disclosure relates to ambient lighting jig assemblies for determining the appropriate position of a light source in relation to a trim panel. In an embodiment, the ambient lighting jig assembly generally includes a support assembly, a trim panel, an insert panel, and a light source. The support assembly defines an inner support cavity. The trim panel is configured to be coupled to the support assembly and at least partly defines a jig opening. The insert panel is configured to be rotatably coupled with respect to the support assembly within the jig opening and has a reflective surface. The light source is configured to emit a light stream. Further, the light source is configured to be rotatably coupled with respect to the support assembly within the inner support cavity at a plurality of angular positions so that the light stream is projectable onto the reflective surface. The ambient lightning jig assembly can be used for use in determining an optimal angle for the insert panel and the light source from a predetermined point of view, such as a vehicle occupant's seated position, such that the light effect, not the reflection of the inside packaging of on the reflective surface, is viewed by the vehicle occupant.

In the embodiment, the insert panel may be configured to be coupled to the support assembly at a plurality of pivotal positions. The trim panel may be referred to as an upper trim panel, and the ambient lighting jig assembly may further include a lower trim panel. The upper and lower trim panels may jointly define the jig opening therebetween.

In the embodiment, the support assembly defines at least one light source opening configured to receive a portion of the light source so that the light source is configured to be coupled to the support assembly at the plurality of angular positions. The support assembly may define a plurality of light source holes. The light source may include a light source body and a light source protrusion extending from the light source body. The light source protrusion may be configured to be received in each of the light source holes so as to fix the light source at one of the plurality of angular positions.

In the embodiment, the support assembly includes first and second support sidewalls spaced apart from each other. The first support sidewall defines the light source opening and the plurality of light source holes. In particular, the support assembly may define at least one insert panel opening configured to receive a portion of the insert panel so that the insert panel is configured to be coupled to the support assembly at a plurality of pivotal positions. The insert panel may include an insert panel body and a locking insert protrusion extending from the insert panel body. The support assembly may define a plurality of insert panel holes each configured to receive the locking insert protrusion to fix the insert panel at one of the plurality of pivotal positions. The first support sidewall may define the insert panel opening and the plurality of insert panel holes.

In the embodiment, the present ambient lighting jig assembly includes a first support sidewall and a second support sidewall spaced apart from the first support sidewall. The ambient lighting jig assembly further includes an upper trim panel configured to be coupled between the first and second support sidewalls and a lower trim panel configured to be coupled between the first and second support sidewalls. The upper trim panel and the lower trim panel jointly defining a jig opening therebetween. The ambient lighting jig assembly further includes an insert panel having a reflective surface. The insert panel is configured to be coupled between the first and second support sidewalls within the jig opening at a plurality of pivotal positions. The ambient lighting jig assembly further includes a light source configured to be coupled between the first and second support sidewalls.

In an embodiment, the light source is configured to be coupled between the first and second support sidewalls at a plurality of angular positions. The first support sidewall defines a light source opening configured to receive a portion of the light source so that the light source is configured to be coupled between the first and second support sidewalls at the plurality of angular positions. The first support sidewall defines a plurality of light source holes. The light source includes a light source body and a light source protrusion extending from the light source body. The light source protrusion is configured to be received in each of the light source holes so as to fix the light source at one of the plurality of angular positions. The first support sidewall defines an insert panel opening configured to receive a portion of the insert panel so that the insert panel is configured to be coupled to the first support sidewall at a plurality of pivotal positions. The insert panel includes an insert panel body and a locking insert protrusion extending from the insert panel body. The first support sidewall defines a plurality of insert panel holes each configured to receive the locking insert protrusion to fix the insert panel at one of the plurality of pivotal positions.

The present disclosure also relates to a method of determining an appropriate position of the light source relative to an insert panel with respect to a predetermined line of sight. In an embodiment, this method includes energizing the light source to project a light stream onto an insert panel using any suitable light source; observing the light stream projected onto the insert panel; and, if the desired lighting effect on the insert panel is observed, coupling the light source and the insert panel with respect to each other to determine and fix the light source at an angular position relative to the insert panel sufficient to optimize the light effect on the insert panel from the predetermined line of sight. The method may include rotating the light source with respect to the insert panel and a trim panel. The angular position of the light source relative to the insert panel may be recorded. Furthermore, the method may include pivoting the insert panel relative to the trim panel, such as the upper trim panel, to a pivotal position before coupling the light source and the insert panel between the first support sidewall and the second support sidewall. Then, the pivotal position of the insert panel relative to the light source may be recorded.

The present disclosure also relates to methods of manufacturing vehicles. In particular, the present disclosure relates to methods of manufacturing a panel assembly for a vehicle. In an embodiment, the method includes energizing a light source to project a light stream onto an insert panel and observing the light stream projected onto the insert panel. If the light stream is visible along a predetermined line of sight, the light source and the insert panel are affixed with respect to the trim panel. After affixing the light source with respect to the trim panel, a first angular position of the light source relative with respect to the trim panel is determined, and a second angular position of the insert panel with respect to the trim panel is determined. A vehicle light source is operatively coupled to a vehicle trim panel such that the vehicle light source is oriented at the first angular position relative to the vehicle trim panel. A vehicle insert panel is operatively coupled to a vehicle trim panel such that the vehicle insert panel is oriented at the second angular position relative to the vehicle trim panel.

In an embodiment, the method may further include rotating the light source to move the light stream with respect to the insert panel and pivoting the insert panel relative to the trim panel. The light source and the insert panel may be affixed with respect to the trim panel by coupling the light source and the insert panel between first and second support sidewalls. The first angular position of the light source relative to the trim panel may be determined by observing light source positional indicia on the first support sidewall. The light source positional indicia may be representative of the first angular position of the light source relative to the trim panel.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
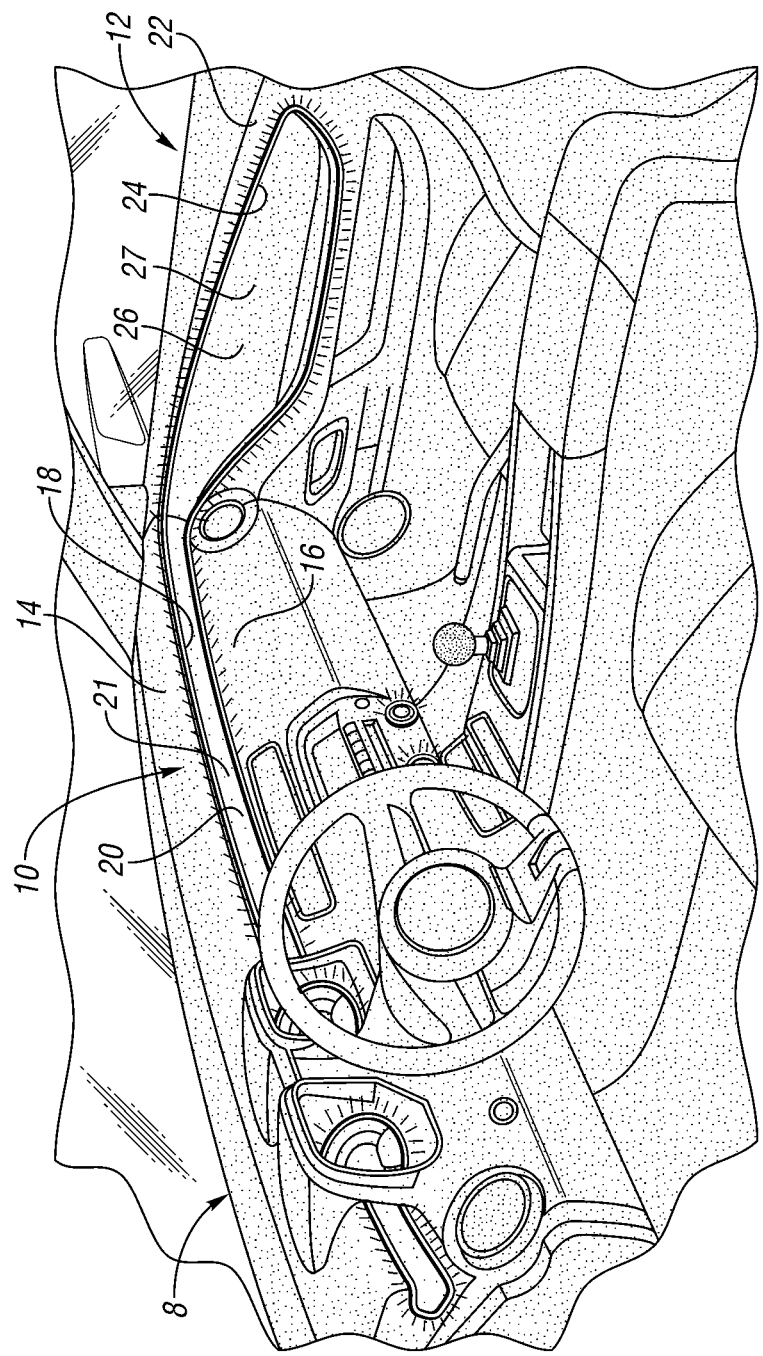
FIG. 1 is a fragmentary schematic perspective view of an interior of a motor vehicle having illuminated insert panels.

Referring to the drawings, wherein like reference numbers refer to like components, FIG. 1 shows an interior of a vehicle 8 including an instrument panel assembly 10 and a door 12. The instrument panel assembly 10 includes an upper instrument trim panel 14 and a lower instrument trim panel 16. The upper instrument trim panel 14 and the lower instrument trim panel 16 jointly define an instrument opening 18 therebetween. The instrument panel assembly 10 further includes an instrument insert panel 20 configured and sized to be disposed in the instrument opening 18 between the upper instrument trim panel 14 and the lower instrument trim panel 16. The instrument insert panel 20 may include an instrument reflective surface 21 made of a suitable reflective material such as a high gloss wood or an open pore satin wood. As used herein, the term "reflective" means capable of reflecting light and images. The instrument panel assembly 10 houses a light source (not shown) configured to emit a light to illuminate the instrument reflective surface 21, thereby enhancing the aesthetic appeal of the vehicle 8. The instrument panel assembly 10 defines a gap (not shown) between the upper instrument trim panel 14 and the instrument insert panel 20. This gap allows the light emitted by the light source (not shown) to travel outside the instrument panel assembly 10.

The door 12 includes a door trim panel 22 and a door insert panel 26. The door trim panel 22 defines a door trim opening 24 configured and shaped to receive a portion of the door insert panel 26. The door insert panel 26 includes a door reflective surface 27 made of a suitable reflective material such as a high gloss wood or an open pore satin wood. The door 12 contains a light source (not shown) configured to illuminate the door reflective surface 27, thus enhancing the aesthetic appeal of the vehicle 8. The door 12 defines a gap (not shown) configured and sized to allow the light emitted by the light source (not shown) to travel outside the door 12.

While it is desirable to illuminate the reflective surfaces (such as instrument reflective surface 21 and the door reflective surface 27) of the vehicle 8 to enhance its ornamental appeal, projecting a light on such reflective surfaces may cause an image of an interior structure of the vehicle 8 to be reflected toward the occupant's line of sight. As a consequence, the vehicle occupants may observe the interior structure housed within the instrument panel assembly 10 or the door 12 instead of merely observing light cascading onto the reflective surface. Therefore, it is desirable to adjust the positions of the light source and the reflective surface to prevent or at least minimizing the probability of a vehicle occupant observing a reflected image of a vehicle interior structure housed within the instrument panel assembly 10 or the door 12. It is also desirable to adjust the positions of the light source and the reflective surface to minimize the amount of light reflected toward the vehicle seats and the occupant's legs. The appropriate positions of the light source and the reflective surfaces may be determined through computer modeling processes. However, such computer modeling processes may be time consuming. It is therefore desirable to develop an apparatus and methods for easily and quickly determining the appropriate positions of the light source and the reflective surfaces.

Figure 2:
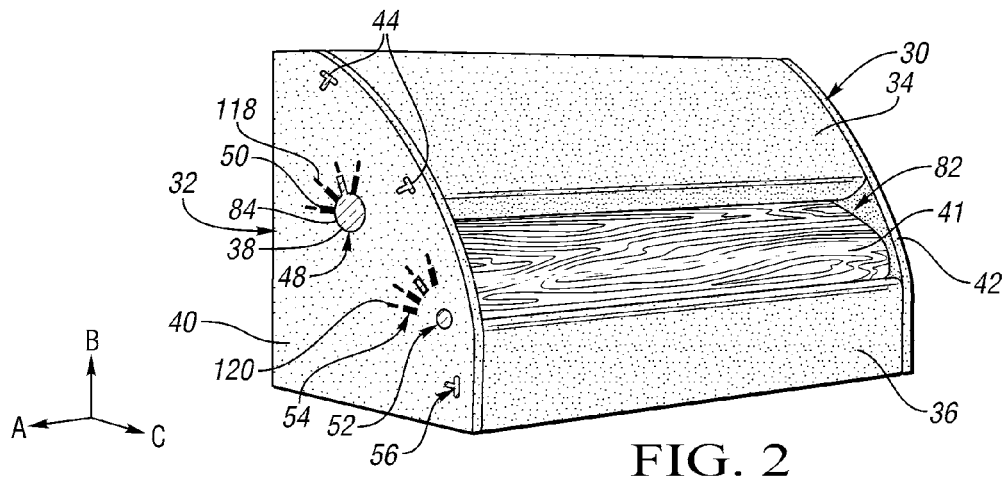
FIG. 2 is a schematic perspective view of an ambient lighting jig assembly including a light source, first and second support sidewalls, an upper trim panel, a lower trim panel, and an insert panel disposed between the upper and lower trim panels.

With reference to FIG. 2, an ambient lighting jig assembly 30 can be used to determine the appropriate positions of a light source and a reflective surface (such as instrument reflective surface 21 and door reflective surface 27) of the vehicle 8 (FIG. 1). The appropriate positions of the light source and the reflective are then recorded. This recorded positional information can then be used to make the instrument panel assembly 10 and the door 12 (FIG. 1).

In an exemplary embodiment, the jig assembly 30 includes a support assembly 32, an upper trim panel 34, a lower trim panel 36, a light source 38, and an insert panel 41 disposed between the upper trim panel 34 and the lower trim panel 36. The upper trim panel 34 and the lower trim panel 36 jointly define a jig opening 82 therebetween. The insert panel 41 may be disposed in the jig opening 82. The jig assembly 30 may not include the lower trim panel 36 and, in such case, the upper trim panel 34 may be referred to as the trim panel and may define at least a portion of the jig opening 82.

Figure 3:
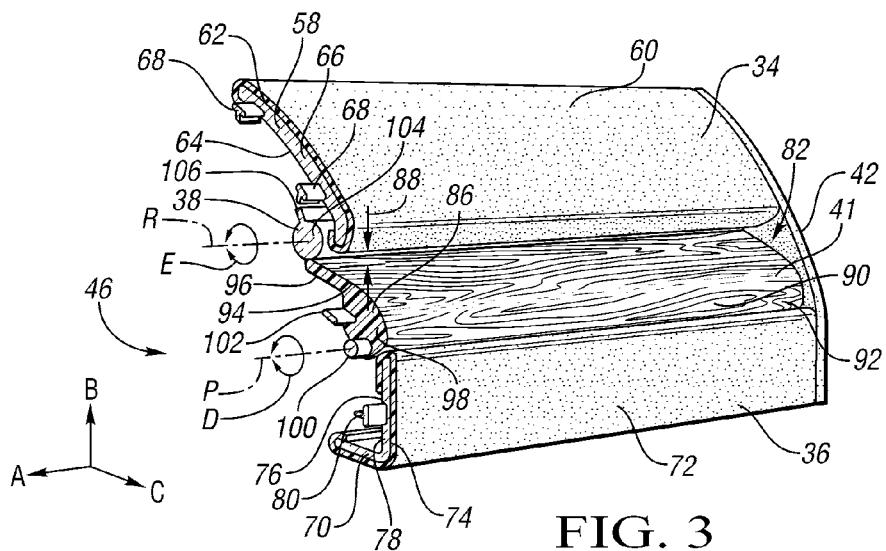
FIG. 3 is a schematic perspective view, partly in section, of the ambient lighting jig assembly shown in FIG. 2 without one of the support sidewalls.

The support assembly 32 includes a first support sidewall 40 and a second support sidewall 42 that may be substantially similar to each other. The first support sidewall 40 and the second support sidewall 42 may be spaced apart from each other to define an inner support cavity 46 (FIG. 3). Specifically, the second support sidewall 42 may be spaced apart from the first support sidewall 40 along a first direction, which is indicated by arrow A, to define the inner support cavity 46 (FIG. 3). The inner support cavity 46 (FIG. 3) is disposed between the first support sidewall 40 and second support sidewall 42 and is configured, shaped, and sized to receive at least a portion of the light source 38 and the insert panel 41. The jig opening 82 leads to the inner support cavity 46 (FIG. 3).

The first support sidewall 40 and the second support sidewall 42 may collectively support the upper trim panel 34, the lower trim panel 36, the light source 38, and the insert panel 41. Thus, the upper trim panel 34, the lower trim panel 36, the light source 38, and the insert panel 41 are detachably coupled to the support assembly 32. In particular, the first support sidewall 40 and the second support sidewall 42 may be detachably coupled to the upper trim panel 34, the lower trim panel 36, the light source 38, and the insert panel 41.

The upper trim panel 34 may be configured to be coupled to the support assembly 32. In particular, the upper trim panel 34 is configured to be operatively coupled between the first support sidewall 40 and the second support sidewall 42 at a fixed position relative to the support assembly 32. The lower trim panel 36 is also configured to be coupled to the support assembly 32. Specifically, the lower trim panel 36 is configured to be operatively coupled between the first support sidewall 40 and the second support sidewall 42 at a fixed position relative to the support assembly 32.

Figure 4:
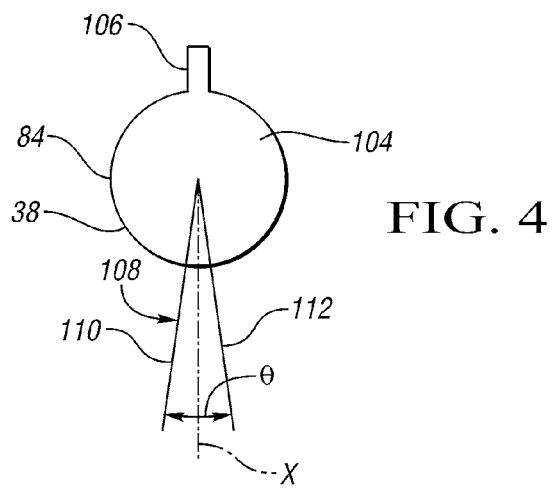
FIG. 4 is a schematic side view of the light source depicted in FIG. 2.

The light source 38 is configured to be coupled to the support assembly 32 and can emit a light stream 108 (FIG. 4). In particular, the light source 38 is configured to be operatively coupled between the first support sidewall 40 and the second support sidewall 42 within the inner support cavity 46 (FIG. 3) at a plurality of angular positions. In all or some of these angular positions, the light source 38 can project the light stream 108 (FIG. 4) toward the insert panel 41. The angular position of the light source 38 relative to the support assembly 32 can be changed by detaching the first support sidewall 40 and the second support sidewall 42 from the light source 38, rotating the light source 38, and then reattaching the first support sidewall 40 and the second support sidewall 42 to the light source 38. It is nevertheless contemplated that the light source 38 may be rotatably coupled to the first support sidewall 40 and the second support sidewall 42. Accordingly, the light source 38 may be configured to rotate relative to the support assembly 32. The angular position of the light source 38 relative to the upper trim panel 34 may be referred to as a first angular position.

The insert panel 41 is configured to be coupled to the support assembly 32 within the jig opening 82. In particular, the insert panel 41 is configured to be operatively coupled between the first support sidewall 40 and the second support sidewall 42 at a plurality of pivotal positions. The pivotal position of the insert panel 41 with respect to the support assembly 32 can be changed by detaching the first support sidewall 40 and the second support sidewall 42 from the insert panel 41, pivoting the insert panel 41, and subsequently reattaching the first support sidewall 40 and the second support sidewall 42 to the insert panel 41. It is nonetheless envisioned that the insert panel 41 may be pivotally coupled to the first support sidewall 40 and the second support sidewall 42. Therefore, the insert panel 41 may be configured to pivot relative to the first support sidewall 40 and the second support sidewall 42. The pivotal position of the insert panel 41 relative to the upper trim panel 34 may be referred to as a second angular position.

Although the drawings mostly depict the details of the first support sidewall 40, the second support sidewall 42 may have the same features as the first support sidewall 40. Thus, in the interest of brevity, the present disclosure only describes in detail the particular features of the first support sidewall 40. However, the second support sidewall 42 may have all or some of the features of the first support sidewall 40 described herein. The first support sidewall 40 defines one or more upper trim openings 44 configured, shaped, and sized to receive one or more portions of the upper trim panel 34 to detachably couple the upper trim panel 34. In the depicted embodiment, each of the upper trim openings 44 may be substantially T-shaped and is configured to mate with a matching portion of the upper trim panel 34. As discussed in detail below, when such mating portion is disposed in the upper trim opening 44, the first support sidewall 40 is substantially fixed to the upper trim panel 34. Accordingly, the first support sidewall 40 remains stationary relative to the upper trim panel 34. The first support sidewall 40 may include two upper trim openings 44 spaced apart from each other along a second direction, which is indicated by arrow B, and a third direction, which is indicated by arrow C. The second direction indicated by arrow B may be substantially perpendicular to the third direction indicated by arrow C. The first direction indicated by arrow A may be substantially perpendicular to the second direction indicated by arrow B and the third direction indicated by arrow C.

The first support sidewall 40 may further define at least one light source opening 48 configured, shaped, and sized to receive at least a portion of the light source 38. The light source opening 48 may be substantially circular and configured and shaped to mate with an end portion of the light source 38. For example, the light source opening 48 may have a substantially circular shape and may be configured to receive a cylindrical portion of the light source 38. The substantially circular shape of the light source opening 48 allows the light source 38 to be disposed at different angular positions relative to the first support sidewall 40 and the second support sidewall 42.

The first support sidewall 40 may further define a plurality of light source holes 50 arranged circumferentially around the light source opening 48. The light source holes 50 may be configured as slits and may be spaced apart from one another at a predetermined equal angular spacing. This predetermined equal angular spacing may be, for example, about 2.5 degrees. Accordingly, the light source holes 50 may be angularly spaced from one another by about 2.5 degrees. The first support sidewall 40, the second support sidewall 42, or both may include light source positional indicia 118 associated with each light source hole 50 to facilitate recording the angular position of the light source 38 relative to the upper trim panel 34 and the insert panel 41. The light source positional indicia 118 may be disposed next to each light source hole 50 and may include angle measurement markings representative of the angular position of the light source 38 in relation to the insert panel 41, the upper trim panel 34, or both.

The light source holes 50 allow the light source 38 to be locked at predetermined angular positions relative to the first support sidewall 40 and the second support sidewall 42. In the depicted embodiment, each light source hole 50 is open to the light source opening 48. Each light source hole 50 may nevertheless be spaced apart from the light source opening 48 so that none of the light source holes 50 are open to the light source opening 48.

In addition to the light source holes 50, the first support sidewall 40 defines an insert panel opening 52 configured, sized, and shaped to receive at least a portion of the insert panel 41 so that the first support sidewall 40 may be detachably coupled to the insert panel 41. The insert panel opening 52 may be substantially circular and may be configured to receive a matching portion of the insert panel 41. The substantially circular shape of the insert panel opening 52 allows the insert panel 41 to be disposed at different pivotal positions relative to the first support sidewall 40 and the second support sidewall 42.

Furthermore, the first support sidewall 40 defines a plurality of insert panel holes 54 arranged circumferentially around the insert panel opening 52. The insert panel holes 54 may be configured as slits and may be spaced apart from one another at a predetermined equal angular spacing. This predetermined equal angular spacing may be, for example, about 2.5 degrees. Therefore, the insert panel holes 54 may be spaced apart from one another by about 2.5 degrees. The insert panel holes 54 allows the insert panel 41 to be locked at predetermined pivotal positions relative to the first support sidewall 40 and the second support sidewall 42. In the depicted embodiment, none of the insert panel holes 54 are open to the insert panel opening 52. However, some or all the insert panel holes 54 may alternatively be open to the insert panel opening 52. The first support sidewall 40, the second support sidewall 42, or both may include insert panel positional indicia 120 associated with each insert panel hole 54 to facilitate recording the pivotal position of the insert panel 41 relative to the upper trim panel 34 and the insert panel 41. The insert panel positional indicia 120 may be disposed next to each insert panel hole 54 and may include angle measurement markings representative of the pivotal position of the insert panel 41 in relation to the light source 38, the upper trim panel 34, or both.

The first support sidewall 40 may further define at least one lower trim opening 56 configured, shaped, and sized to receive a portion of the lower trim panel 36, thereby permitting the lower trim panel 36 to be detachably coupled to the first support sidewall 40. The lower trim opening 56 may be substantially T-shaped and is configured to mate with a matching portion of the lower trim panel 36. When such mating portion of the lower trim panel 36 is disposed in the lower trim opening 56, the first support sidewall 40 is substantially fixed to the lower trim panel 36. Accordingly, the first support sidewall 40 remains stationary relative to the lower trim panel 36.

With reference to FIG. 3, the upper trim panel 34 simulates a trim panel such as the upper instrument trim panel 14 and the door trim panel 22 (FIG. 1) and may have a substantially curved shape. In the depicted embodiment, the upper trim panel 34 includes an upper trim body 58 and an upper trim covering 60 that surrounds at least a portion of the upper trim body 58. The upper trim body 58 may be partly or wholly made of a substantially rigid material such as a hard plastic and defines an upper body front surface 62 and an upper body rear surface 64 opposite the upper body front surface 62. Furthermore, the upper trim body 58 defines a pair of upper body sidewalls 66 each disposed between the upper body front surface 62 and the upper body rear surface 64.

The upper trim panel 34 further includes one or more upper body protrusions 68 extending from the upper trim body 58. Although not specifically shown in the drawings, the upper body protrusions 68 may extend from each upper body sidewall 66 of the upper trim body 58. Specifically, at least some upper body protrusions 68 may extend from one of the upper body sidewall 66 in the first direction, which is indicated by arrow A, while other upper body protrusions 68 may extend from another upper body sidewall 66 in a direction opposite the first direction. All or some of the upper body protrusions 68 may be monolithically formed with the upper trim body 58. Alternatively, the upper body protrusions 68 may be discrete components coupled to the upper trim body 58. In the depicted embodiment, for example, the upper trim panel 34 includes two upper body protrusions 68 in each upper body sidewall 66. It is contemplated, however, that the upper trim panel 34 may include more or fewer upper body protrusions 68. Irrespective of the number of upper body protrusions 68, each upper body protrusion 68 is configured, shaped, and sized to be received in one of the upper trim openings 44 in order to detachably couple the upper trim panel 34 to one of the support sidewalls 40 or 42 (FIG. 2). For instance, each upper body protrusion 68 may be substantially T-shaped and may therefore be configured to be received in a substantially T-shaped upper trim opening 44 (FIG. 2). Nevertheless, each upper body protrusion 68 may have other suitable shapes as long as it is configured to mate with one upper trim opening 44 so as to detachably couple the upper trim panel 34 to the first support sidewall 40 or the second support sidewall 42.

As discussed above, the upper trim panel 34 includes the upper trim covering 60 disposed over a portion of the upper trim body 58. The upper trim covering 60 may be wholly or partly made of upholstery, such as suede, and may cover the upper body front surface 62 and a portion of the upper body rear surface 64. No portion of the upper trim covering 60 covers the upper body sidewalls 66.

The lower trim panel 36 simulates a trim panel such as the lower instrument trim panel 16 (FIG. 2) and may be substantially L-shaped. In the depicted embodiment, the lower trim panel 36 includes a lower trim body 70 and a lower trim covering 72 surrounding at least a portion of the lower trim body 70. The lower trim body 70 may be partly or wholly made of a substantially rigid material such as a hard plastic and defines and a lower body front surface 74 and a lower body rear surface 76 opposite the lower front surface 74. Moreover, the lower trim body 70 defines a pair of lower body sidewalls 78 each disposed between the lower body front surface 74 and the lower body rear surface 76.

The lower trim panel 36 further includes one or more lower body protrusions 80 extending from the lower trim body 70. Though not specifically shown in the drawings, the lower body protrusions 80 may extend from each lower body sidewall 78 of the lower trim body 70. In particular, at least one lower body protrusion 80 may extend from one of the lower body sidewalls 78 in the first direction, which is indicated by arrow A, while another lower body protrusion 80 may extend from the other lower body sidewall 78 in a direction opposite the first direction. The lower body protrusions 80 may be monolithically formed with the lower trim body 70. Alternatively, the lower body protrusions 80 may be discrete components coupled to the lower trim body 70. In the depicted embodiment, the lower trim panel 36 includes one lower body protrusion 80 in each lower body sidewall 78. However, the lower trim panel 36 may include more or fewer lower body protrusions 80. Regardless of the number of lower body protrusions 80, each lower body protrusion 80 is configured, shaped, and sized to be received in one of the lower trim openings 56 in order to detachably couple the lower trim panel 36 to one of the support sidewalls 40 or 42 (FIG. 2). For example, each lower body protrusion 80 may be substantially T-shaped and may therefore be configured to be received in a substantially T-shaped lower trim opening 56. (FIG. 2) It is envisioned, however, that each lower body protrusion 80 may have other suitable shapes so long as it is configured to mate with one lower trim opening 56 so as to detachably couple the lower trim panel 36 to the first support sidewall 40 or the second support sidewall 42.

The lower trim panel 36 includes the lower trim covering 72 disposed over a portion of the lower trim body 70. The lower trim covering 72 may be wholly or partly made of upholstery, such as suede, and may cover the lower body front surface 74 and a portion of the lower body rear surface 76. No portion of the lower trim covering 72 covers the lower body sidewalls 78.

The insert panel 41 can be detachably coupled between the first support sidewall 40 (FIG. 2) and the second support sidewall 42 and between the upper trim panel 34 and the lower trim panel 36. Specifically, the insert panel 41 may be at least partly disposed in the jig opening 82 defined by the upper trim panel 34 and the lower trim panel 36. The upper trim panel 34 and the insert panel 41 collectively define a gap 88 therebetween. The gap 88 allows the light emitted by the light source 38 to travel outside the jig assembly 30.

The insert panel 41 may have different shapes and sizes. For example, the insert panel 41 may be substantially planar or curved. If the insert panel 14 is curved, its curvature may be substantially constant or may vary along the first direction indicated by arrow A, the second direction indicated by arrow B, or the third direction indicated by arrow C. Irrespective of its shape, the insert panel 41 is configured to be coupled to the support assembly 32.

In operation, the pivotal position of the insert panel 41 relative to the upper trim panel 34 and the lower trim panel 36 can be adjusted until the desired lighting effect on the insert panel 41 is observed as discussed in detail below. To this end, the insert panel 41 is configured to pivot about a pivot axis P in the rotational directions indicated by double arrow D when at least one of the first support sidewall 40 or the second support sidewall 42 is detached from the insert panel 41. Alternatively, the insert panel 41 may be configured to pivot about the pivot axis P even when coupled to the first support sidewall 40 (FIG. 2) and the second support sidewall 42.

The insert panel 41 includes an insert panel body 86 and a decorative layer 90 wrapping a portion of the insert panel body 86. The insert panel body 86 defines a lower body front surface 94 and a lower body rear surface 96 opposite the lower body front surface 94. Moreover, the insert panel body 86 defines a pair of lower body sidewalls 98 each disposed between the lower body front surface 94 and the lower body rear surface 96.

The decorative layer 90 covers the lower body front surface 94 of the insert panel body 86 and defines a decorative reflective surface 92 made of a suitable reflective material such as a high gloss wood or an open pore satin wood. The reflective surface 92 faces away from the inner support cavity 46 collectively defined by the first support sidewall 40 (FIG. 2) and the second support sidewall 42. The reflective surface 92 may simulate the instrument reflective surface 21 or the door reflective surface 27 (FIG. 1).

The insert panel 41 may include one or more adjustable insert protrusions 100 extending from the insert panel body 86. Each adjustable insert protrusion 100 may be elongated along the pivot axis P. Although not specifically shown in the drawings, the adjustable insert protrusions 100 may extend from each insert body sidewall 98. In particular, one adjustable insert protrusion 100 may extend from one insert body sidewall 98 in the first direction, which is indicated by arrow A, while another adjustable insert protrusion 100 may extend from the other insert body sidewall 98 in a direction opposite the first direction. One or more of the adjustable insert protrusions 100 may be monolithically formed with the insert panel body 86. Alternatively, the adjustable insert protrusions 100 may be discrete components coupled to the insert panel body 86.

In the depicted embodiment, the insert panel 41 includes one adjustable insert protrusion 100 extending from each insert body sidewall 98. However, the insert panel 41 may include more or fewer adjustable insert protrusions 100. Regardless of the number of adjustable insert protrusions 100, each adjustable insert protrusion 100 is configured, shaped, and sized to be received in the insert panel opening 52 (FIG. 2) so that the insert panel 41 can be detachably coupled to the support assembly 32 (FIG. 2) along a range of pivotal positions with respect to the upper trim panel 34 and the light source 38. For example, each adjustable insert protrusion 100 may be substantially cylindrical and may therefore be configured to be received in a substantially circular insert panel opening 52 (FIG. 2). However, each adjustable insert protrusion 100 may have other suitable shapes so long as it is configured to mate with the insert panel opening 52 (FIG. 2) so as to detachably couple the insert panel 41 to the first support sidewall 40 (FIG. 2) and the second support sidewall 42.

The insert panel 41 further includes one or more locking insert protrusions 102 extending from the insert panel body 86. Though not specifically shown in the drawings, the locking insert protrusions 102 may extend from each insert body sidewall 98. In particular, one locking insert protrusion 102 may extend from one insert body sidewall 98 in the first direction, which is indicated by arrow A, while another locking insert protrusion 102 may extend from the other insert body sidewall 98 in a direction opposite the first direction. The locking insert protrusions 102 may be monolithically formed with the insert panel body 86. Alternatively, the locking insert protrusion 102 may be discrete components coupled to the insert panel body 86.

In the depicted embodiment, the insert panel 41 includes one locking insert protrusion 102 extending from each insert body sidewall 98. However, the insert panel 41 may include more or fewer locking insert protrusions 102. Each locking insert protrusion 102 is configured, shaped, and sized to be received in one of the insert panel holes 54 to fix the insert panel 41 relative to the upper trim panel 34 and the light source 38 at a predetermined pivotal position. As discussed above, the first support sidewall 40 and the second support sidewall 42 each may include insert panel holes 54 angularly spaced from one another by a predetermined equal angular spacing, thereby allowing the insert panel 41 to be locked relative to the upper trim panel 34 at predetermined pivotal positions. Each locking insert protrusion 102 may have a substantially polygonal cross-section. Irrespective of its shape, each locking insert protrusion 102 is configured to mate with one of the insert panel holes 54 to detachably couple the insert panel 41 to one of the first support sidewall 40 (FIG. 2) or the second support sidewall 42 at a predetermined pivotal position.

The light source 38 is configured to be coupled to the support assembly 32 (FIG. 2) within the inner support cavity 46 at a plurality of angular positions. In particular, the light source 38 can be detachably coupled between the first support sidewall 40 (FIG. 2) and the second support sidewall 42. When coupled between the first support sidewall 40 (FIG. 2) and the second support sidewall 42, the light source 38 is disposed within the inner support cavity 46 such that its emitting light can enter (and possibly pass through) the gap 88 defined between the upper trim panel 34 and the insert panel 41.

In the depicted embodiment, the light source 38 is elongated along a rotational axis R and is configured to emit a visible light upon receipt of electrical energy from a power source (not shown). The light source 38 may include a light source body 104 and a light source protrusion 106 extending from the light source body 104. A portion of the light source body 104 can be configured, shaped, and sized to be received in the light source opening 48 (FIG. 2), thus allowing the light source 38 to be detachably coupled to at least one of the first support sidewall 40 (FIG. 2) or the second support sidewall 42 along a range of angular positions. For example, the light source body 104 may be substantially cylindrical and may therefore be configured to be received in a substantially circular light source opening 48 (FIG. 2).

The light source protrusion 106 may extend radially outward from the light source body 104 and is configured, shaped, and sized to be received in one of the light source holes 50 to fix the light source 38 with respect to the upper trim panel 34 and the insert panel 41 at a predetermined angular position. In operation, at least one of the first support sidewall 40 or the second support sidewall 42 may be detached from the light source 38. Then, the light source 38 may be rotated about the rotational axis R in any of the rotational directions indicated by double arrow E until the desired lighting effect on the insert panel 41 is observed. At least one of the first support sidewall 40 (FIG. 2) or the second support sidewall 42 can be subsequently reattached to the light source 38 by positioning an end of the light source body 104 in the light source opening 48 and positioning a portion of the light source protrusion 106 in one of the light source holes 50 to lock the angular position of the light source 38 with respect to the upper trim panel 34 and the insert panel 41.

With reference to FIG. 4, the light source 38 may be a light pipe 84 configured to project a band of light along its entire length. For example, the light pipe 84 may include one or more light-emitting diodes (LEDs) configured to project a visible light. The LEDs may be located at the ends of the light pipe 84. Regardless of its configuration, the light source 38 is configured to project a light stream 108 spanning across a predetermined stream angle θ. The light stream 108 may define a first stream boundary 110, a second stream boundary 112, and a center light axis X extending between the first stream boundary 110 and the second stream boundary 112. The stream angle θ is defined from the first stream boundary 110 to the second stream boundary 112. In an embodiment, the stream angle θ may be about 14 degrees. The center light axis X extends through the middle of the light stream 108 and may therefore bisect the stream angle θ.

Figure 5A:
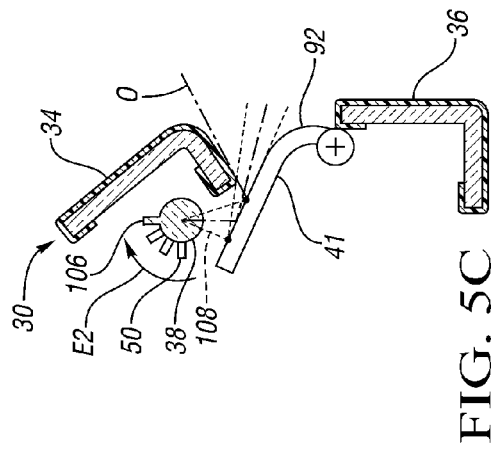
FIGS. 5A, 5B, and 5C are schematic side views, partly in section, of the ambient lighting jig assembly shown in FIG. 2, depicting the light source in different angular positions.
Figure 5B:
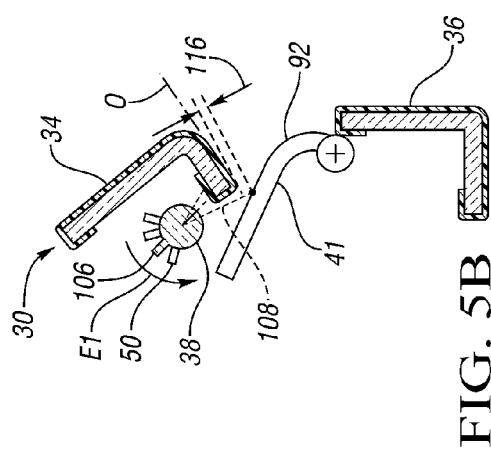
Figure 5C:
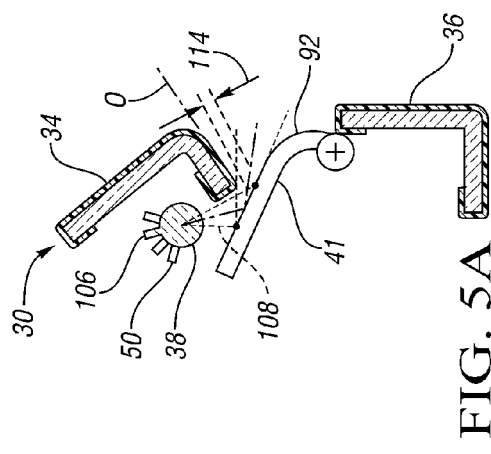

With reference to FIGS. 5A-5C, as discussed above, the jig assembly 30 can be employed to determine the appropriate position of the light source 38 relative to the upper trim panel 34 and the insert panel 41. In particular, the position of the light source 38 relative to the insert panel 41 and the upper trim panel 34 should allow at least a portion of the light stream 108 to be projected on the reflective surface 92 and reflected toward the vehicle occupant's line of sight O. The vehicle occupant's line of sight O may define a predetermined point of view. Moreover, the light source 38 should be positioned in relation to the upper trim panel 34 and the insert panel 41 so that an image of the interior structure (such as the light source 38) of the vehicle 8 is not reflected toward a seated occupant's line of sight O. Rather, the vehicle occupant should observe light cascading onto the reflective surface 92, i.e., a desired ambient lightning effect.

To determine its appropriate position, the light source 38 can be rotated about rotational axis R (FIG. 3) through a plurality of angular positions. Specifically, the light source 38 is configured to be rotated about the rotational axis R (FIG. 3) in a first light rotational direction, which is indicated by arrow E1, and a second light rotational direction, which is indicated by arrow E2, in order to change the position of the light stream 108. The second light rotational direction indicated by arrow E2 may be opposite the first light rotational direction E1. For example, in a first angular position shown in FIG. 5A, all or at least most of the light stream 108 emitted by the light source 38 is projected onto the reflective surface 92 and reflected along the occupant's line of sight O. Accordingly, when the light source 38 is in the first angular position shown in FIG. 5A, a first portion 114 of the light stream 108 is visible to the vehicle occupant. In a second angular position shown in FIG. 5B, part of the light stream 108 is trapped by the upper trim panel 34 and, consequently, only a portion of the light stream 108 is projected onto the reflective surface 92 and reflected along the occupant's line of sight O. Thus, when the light source 38 is in the second angular position, a second light portion 116 of the light stream 108 is visible to the vehicle occupant. The first light portion 114 may be larger than the second light portion 116. In a third angular position shown in FIG. 5C, all or at least most of the light stream 108 emitted by the light source 38 is projected onto the reflective surface 92 but no portion of the light stream 108 is reflected along the occupant's line of sight O. Therefore, when the light source 38 is in the third angular position, no portion of the light stream 108 is visible to the vehicle occupant. When the light source 30 is in the third angular position, the light stream 108 may be reflected toward the vehicle occupant's legs and the vehicle seats.

Before rotating the light source 38, the first support sidewall 40 and the second support sidewall 42 (FIG. 2) should be detached from the upper trim panel 34, the light source 38, the insert panel 41, and the lower trim panel 36. The light source 38 is subsequently rotated relative to the upper trim panel 34 and the insert panel 41 to a desired angular position. The first support sidewall 40 and the second support sidewall 42 (FIG. 2) may then be coupled to the upper trim panel 34, the light source 38, the insert panel 41, and the lower trim panel 36. In particular, the light source protrusion 106 may be tightly positioned in one of the light source holes 50 to couple the first support sidewall 40 and the second support sidewall 42 to the light source 38, thereby fixing the angular position of the light source 38 relative to the insert panel 41.

Figure 6A:
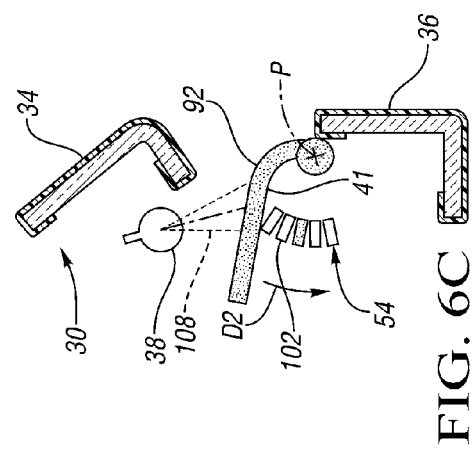
FIGS. 6A, 6B, and 6C are schematic side views, partly in section, of the ambient lighting jig assembly shown in FIG. 2, depicting the insert panel in different pivotal positions.
Figure 6B:
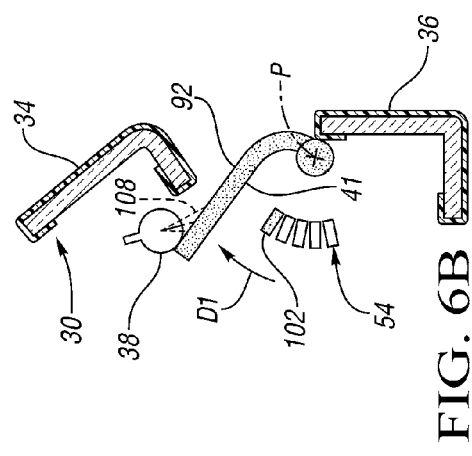
Figure 6C:
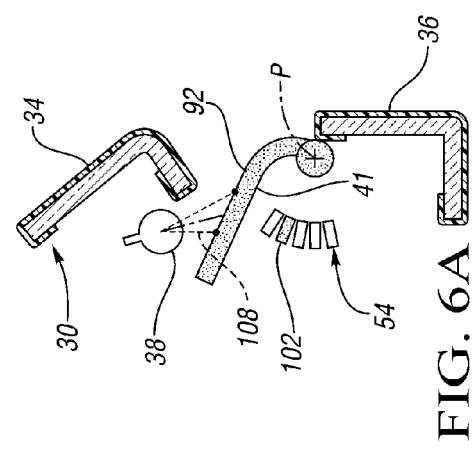

With reference to FIGS. 6A-6C, the insert panel 41 may be pivoted about the pivot axis P through a plurality of pivotal positions to achieve the desired lighting effect on the insert panel 41. Specifically, the insert panel 41 may be pivoted about the pivot axis P relative to the upper trim panel 34 and the light source 38 in a first pivotal direction, which is indicated by arrow D1, and a second pivotal direction, which is indicated by arrow D2 and is opposite the first pivotal direction. While pivoting the insert panel 41, at least a portion of the insert panel 41 moves away or toward the light source 38. Also, the distance defined by the gap 88 as measured along the second direction indicated by arrow B (FIG. 3) may increase or decrease as the insert panel 41 is pivoted relative to the light source 38.

Before pivoting the insert panel 41, the first support sidewall 40 and the second support sidewall (FIG. 2) should be detached from the upper trim panel 34, the light source 38, the insert panel 41, and the lower trim panel 36. The insert panel 41 is then pivoted relative to the upper trim panel 34 and the light source 38 to a desired pivotal position. The first support sidewall 40 and the second support sidewall 42 (FIG. 2) may then be coupled to the upper trim panel 34, the light source 38, the insert panel 41, and the lower trim panel 36. In particular, the locking insert protrusions 102 may be tightly positioned in one of the insert panel holes 54 to couple the first support sidewall 40 and the second support sidewall 42 (FIG. 2) to the insert panel 41, thereby fixing the pivotal position of the insert panel 41 relative to the light source 38.

In operation, the positions of the light source 38 and the insert panel 41 may be adjusted relative to each other several times until the desired ambient lighting effect on the reflective surface 92 is achieved. Then, the user may record the positions of the light source 38 and the insert panel 41 relative to each other. To determine the position of the light source 38, the user may identify the light source hole 50 receiving the light source protrusion 106 and then observe the light source positional indicia 118 associated with that light source hole 50. To determine the position of the insert panel 41, the user may identify the insert panel hole 54 receiving the locking insert protrusion 102 and then observe the insert panel positional indicia 120 associated with that insert panel hole 54. The positions of the insert panel 41 and the light source 38 in relation to each other may be recorded to obtain the positional information of the insert panel 41 and the light source 38. Such positional information may then be used to manufacture an illuminated panel assembly such as the instrument panel assembly 10 and the door trim panel 22. The manufacturing process may further include fine tuning the positional information in a computer. In addition to the positions of the insert panel 41 and the light source 38, the user may measure the length of the gap 88 (FIG. 3) defined from the insert panel 41 to the upper trim panel 34. The length of the gap 88 may be measured along the second direction, indicated by arrow B (FIG. 2). This length may also help in the manufacturing process.

In summary, the method of determining an appropriate position of the light source 38 relative to the insert panel 41 may include several steps. In an embodiment, this method includes rotating the light source 38 relative to the insert panel 41 and a trim panel, such as the upper trim panel 34; energizing the light source 38 to project the light stream 108 onto the insert panel 41; observing the light stream 108 projected onto the insert panel 41; and, if the desired lighting effect on the insert panel 41 is observed, coupling the light source 38, the insert panel 41, and the trim panel, such as the upper trim panel 34, between the first support sidewall 40 and the second support sidewall 42 to determine and fix the light source 38 at an angular position relative to the insert panel 41 sufficient to optimize the light effect on the insert panel 41 from the predetermined line of sight O. The angular position of the light source 38 relative to the insert panel 41 may then be recorded. As discussed above, the angular position of the light source 38 relative to the insert panel 41 or the upper trim panel 34 may be referred to as the first angular position. Furthermore, the method may include pivoting the insert panel 41 relative to a trim panel, such as the upper trim panel 34, to a pivotal position before coupling the light source 38, the insert panel 41, and the trim panel between the first support sidewall 40 and the second support sidewall 42. Then, the pivotal position of the insert panel 41 relative to the light source 38 may be recorded. As discussed above, the pivotal position of the insert panel 41 relative to the light source 38 or the upper trim panel 34 may be referred to as the second angular position, i.e., a position from an occupant's point of view who sees a light effect, not the reflection of the inside packaging of on the reflective surface 92.

After the determining and recording the appropriate angular positions of the light source 38 and the insert panel 41 relative to the upper trim panel 34, such recorded angular positions can be used to manufacture a vehicle. In particular, the recorded angular positions of the light source 38 and the insert panel 41 may be used to manufacture a panel assembly for a vehicle such as the instrument panel assembly 10 and the door trim panel 22. For example, a vehicle light source may be operatively coupled to a vehicle trim panel such that the vehicle light source is oriented at the recorded angular position of the light source 38 relative to the upper trim panel 34. Moreover, a vehicle insert panel may be operatively coupled to the vehicle trim panel such that the vehicle insert panel is oriented at the recorded angular position of the insert panel 41 relative to the upper trim panel 34. In this manufacturing method, the vehicle trim panel may be the upper instrument trim panel 14 or the door trim panel 22, and the vehicle insert panel may be the instrument insert panel 20 or the door insert panel 26 (FIG. 1).

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An ambient lighting jig assembly comprising:
a support assembly defining an inner support cavity;
a trim panel configured to be coupled to the support assembly and at least partly defining a jig opening;
an insert panel configured to be rotatably coupled with respect to the support assembly within the jig opening, the insert panel having a reflective surface; and
a light source configured to emit a light stream, wherein the light source is configured to be rotatably coupled with respect to the support assembly within the inner support cavity at a plurality of adjustable angular positions so that the light stream is projectable onto the reflective surface for use in determining an optimal angle for the insert panel and the light source from a predetermined point of view of the reflective surface.

2. The ambient lighting jig assembly of claim 1, wherein the insert panel is configured to be coupled to the support assembly at a plurality of pivotal positions.

3. The ambient lighting jig assembly of claim 1, wherein the trim panel is an upper trim panel, the ambient lighting jig assembly further comprises a lower trim panel, and the upper and lower trim panels jointly define the jig opening therebetween.

4. The ambient lighting jig assembly of claim 1, wherein the support assembly defines at least one light source opening configured to receive a portion of the light source so that the light source is configured to be coupled to the support assembly at the plurality of angular positions.

5. The ambient lighting jig assembly of claim 4, wherein the support assembly defines a plurality of light source holes, the light source includes a light source body and a light source protrusion extending from the light source body, and the light source protrusion is configured to be received in each of the light source holes so as to fix the light source at one of the plurality of angular positions.

6. The ambient lighting jig assembly of claim 5, wherein the support assembly includes first and second support sidewalls spaced apart from each other, and the first support sidewall defines the at least one light source opening and the plurality of light source holes.

7. The ambient lighting jig assembly of claim 6, wherein the support assembly defines at least one insert panel opening configured to receive a portion of the insert panel so that the insert panel is configured to be coupled to the support assembly at a plurality of pivotal positions.

8. The ambient lightning jig assembly of claim 7, wherein the insert panel includes an insert panel body and a locking insert protrusion extending from the insert panel body, and the support assembly defines a plurality of insert panel holes each configured to receive the locking insert protrusion to fix the insert panel at one of the plurality of pivotal positions.

9. The ambient lighting jig assembly of claim 8, wherein the support assembly includes first and second support sidewalls spaced apart from each other, and the first support sidewall defines the at least one insert panel opening and the plurality of insert panel holes.

10. The ambient lighting jig assembly of claim 9, wherein the first and second support sidewalls are each detachably coupled to the trim panel and the insert panel.

11. A method of determining an appropriate angular position of a light source relative to an insert panel with respect to a predetermined line of sight, comprising:
    energizing the light source to project a light stream onto the insert panel;
    observing the light stream projected onto the insert panel; and
    coupling the light source and the insert panel with respect to each other to determine and fix the light source at an angular position relative to the insert panel sufficient to optimize the light effect on the insert panel from the predetermined line of sight.

12. The method of claim 11, further comprising rotating the light source with respect to the insert panel.

13. The method of claim 11, further comprising recording the angular position of the light source relative to the insert panel.

14. The method of claim 11, further comprising pivoting the insert panel relative to the light source to a pivotal position before coupling the light source and the insert panel between the first and second support sidewalls.

15. The method of claim 14, further comprising recording the pivotal position of the insert panel relative to the light source.

16. A method of manufacturing a panel assembly for a vehicle, comprising:
    energizing a light source to project a light stream onto an insert panel;
    observing the light stream projected onto the insert panel;
    if the light stream is visible along a predetermined line of sight, affixing the light source and the insert panel with respect to a trim panel;
    determining a first angular position of the light source with respect to the trim panel after affixing the light source relative to the trim panel;
    determining a second angular position of the insert panel with respect to the trim panel after affixing the insert panel relative to the trim panel;
    operatively coupling a vehicle light source to a vehicle trim panel such that the vehicle light source is oriented at the first angular position with respect to the vehicle trim panel; and
    operatively coupling a vehicle insert panel to a vehicle trim panel such that the vehicle insert panel is oriented at the second angular position with respect to the vehicle trim panel.

17. The method of claim 16, further comprising rotating the light source to move the light stream with respect to the insert panel.

18. The method of claim 16, further comprising pivoting the insert panel relative to the trim panel.

19. The method of claim 16, wherein affixing the light source and the insert panel with respect to the trim panel includes coupling the light source and the insert panel between first and second support sidewalls.

20. The method of claim 19, wherein determining the first angular position of the light source relative to the trim panel includes observing light source positional indicia on the first support sidewall, the light source positional indicia being representative of the first angular position of the light source relative to the trim panel.

* * * * *